Dec. 15, 1953     G. F. E. LOECK     2,662,443
ERECTING EYEPIECE WITH VARIABLE MAGNIFICATION
Filed Aug. 27, 1951
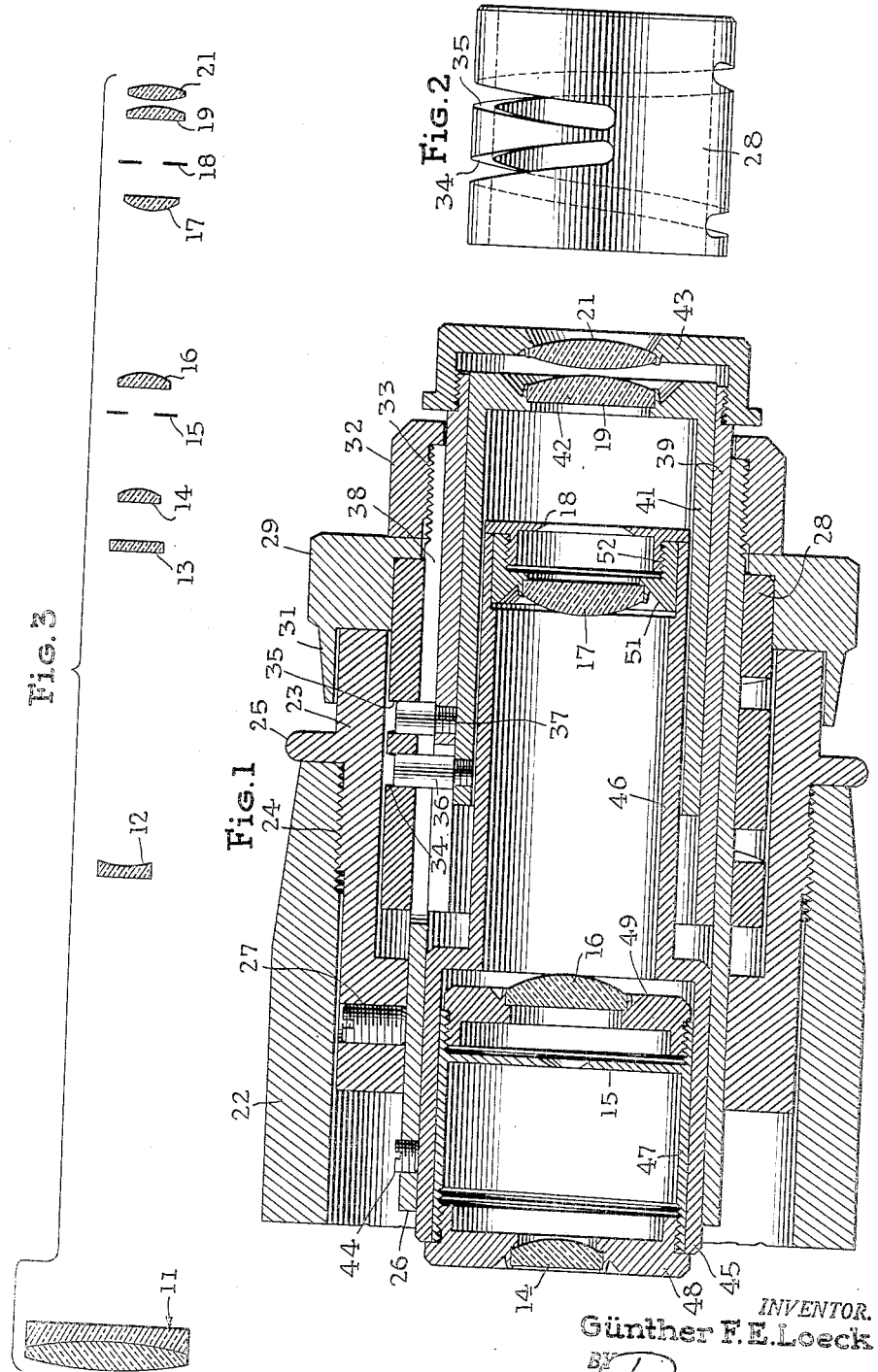
INVENTOR.
Günther F. E. Loeck
Attorneys Patented Dec. 15, 1953

2,662,443

UNITED STATES PATENT OFFICE 2,662,443

ERECTING EYEPIECE WITH VARIABLE MAGNIFICATION

Günther F. E. Loeck, North Troy, N. Y., assignor to W. & L. E. Gurley, Troy, N. Y., a corporation of New York Application August 27, 1951, Serial No. 243,811

4 Claims. (Cl. 88—32)

This invention relates to oculars for variable magnification telescopes.

According to the invention a telescope is provided which has a fixed objective lens system and a fixed erecting lens system. Associated with these lens systems is an ocular comprising at least two lenses which are movable relatively to said objective and erecting lens systems and to each other. Movement of the ocular lenses causes the magnification of the telescope to be varied.

The use of a fixed erecting lens system permits the use of a diaphragm in this lens system which has a fixed position and fixed aperture. Thus the diaphragm may be designed so that optimum optical characteristics can be achieved. The quality of the image produced at the rear focal plane of the erecting lens system is dependent in a large measure on the placement and size of the aperture in this diaphragm.

A further advantage realized by a lens system built according to the invention is that the actual field of view is the same for the various magnification settings of the ocular.

A preferred embodiment of the invention will be described having reference to the accompanying drawing, in which:

Figure 1 is a fragmentary axial section of the telescope showing the erecting lens system and the ocular lens system.

Figure 2 is a side elevation of the adjusting sleeve or cam for the ocular lenses.

Figure 3 is a diagrammatic representation of the lens system of the complete telescope.

Statements of direction refer to parts positioned as in Figure 1.

As indicated in Figure 3, the telescope lens system includes an objective system comprising the objective 11, the negative lens 12 and a graticule 13. These are all fixed in the tube 22 of the telescope by conventional means. The tube 22 of the telescope appears in Figure 1, but the objective end thereof is broken away to shorten Figure 1 and thus permit the use of a large scale. No novelty is here claimed for the mounting of the objective system and hence illustration of these conventional details is deemed to be unnecessary.

The erecting lens system comprises the lens 14, diaphragm 15, lens 16, lens 17 and diaphragm 18 arranged in the order stated, which is to say that the diaphragm 15 is located between the lenses 14 and 16 and the diaphragm 18 at the focal plane of the erecting system. The parts 14 to 18 are fixedly mounted as parts of a sub-assembly hereinafter described in detail. That sub-assembly is fixedly mounted in the telescope tube, provision being made for adjustment of the sub-assembly in the direction of the axis of the tube at the time the sub-assembly is mounted.

The ocular as illustrated comprises two lenses 19 and 21 and an adjusting means common to the two and arranged to move them at chosen rates relatively to each other and to the erecting lens system. The motions of the two lenses 19 and 21 are so coordinated that the anterior focal plane of the ocular is at all times coincident with the posterior focal plane of the erecting lens system.

The desired result can be attained very simply by mounting in the end of the telescope tube an assembly which includes the erecting sub-assembly, in fixed relation to the tube, two telescoping tubes which carry respective ocular lenses, and a swiveled ring and connected adjusting cam sleeve mechanically related to said telescoping tubes. This structure is shown in Figure 1.

A bushing 23 is threaded at 24 into the eyepiece end of tube 22, and has a flange 25 which seats against the end of the tube 22 assuring firm positioning. At the left end it has a bore which supports a fixed guide sleeve 26, and at the right end it has a large counterbore through and beyond which guide sleeve 26 extends. Sleeve 26 is fixed in bushing 23 by a set screw 27.

A tubular cam 28 is rotatable on sleeve 26 and fits an annular socket in adjusting ring 29 with which it is permanently connected. Solder offers a satisfactory connection. The ring 29 has a flange 31 which overhangs the right hand end of bushing 23. Ring 29 is confined between the end of bushing 23 and a ring-nut 32 threaded at 33 on the end of sleeve 26. Cam 28 and connected ring 29 are thus swiveled on guide sleeve 26; i. e. they can rotate together thereon but are restrained against axial displacement in either direction.

Cam 28 is shown clearly in Figure 2 and has two generally helical slots 34 and 35 of opposite pitch. These are not necessarily identical, nor is either necessarily a true helix. Their form will be explained later.

The cam followers are cylindrical pins 36 and 37 which extend through a longitudinal slot 38 in guide sleeve 26. Pin 37 extends radially from the outer one 39 and pin 36 from the inner one 41 of two coaxial telescoping tubes, the outer of which is slidable in guide sleeve 26 and the inner of which is guided in the outer. The slot 38 confines both of the cam followers and so inhibits rotary motion of tubes 39 and 41.

Tube 41 carries an integral mount 42 for lens

19. A mount 43 for lens 21 is threaded to the end of the outer tube 39. Turning of ring 29 in one or the other direction will cause lenses 19 and 21 to approach and recede toward and away from one another. The character of motion of each is a function of the design of cam slots 34 and 35 and these motions are coordinated.

The erecting sub-assembly is fixed in the left hand end of guide tube 26 by set screw 44 which engages the large cylindrical portion 45 of a tubular housing whose small cylindrical portion 46 extends to the right within, but clear of, tube 41. Set screw 44 permits adjustment of the housing 45, 46 in axial directions at the time of assembly.

A cylindrical shell 47 makes a snug fit in portion 45 and carries the diaphragm 15. At its opposite ends it is threaded to receive mounts 48 and 49 for the lenses 14 and 16. At its remote (right hand) end, portion 46 is counterbored to receive an assembly comprising mount 51 for lens 17 and the diaphragm 18, which is threaded at 52 to mount 51.

The forms of cam slots 34 and 35 are determined according to the optical characteristics of lenses 19 and 21 which, respectively, they adjust as ring 29 is turned on tube 22. The cam slots are such that the lenses 19 and 21 considered as a system are always focused in the plane of diaphragm 18. Turning of ring 29 varies the magnification of the eyepiece, but the eyepiece is always in focus.

Since the objective lens system and the erecting lens system are each fixed, the diaphragm 15 may be fixed as to position and size. This determines the amount of light passing through the erecting lens system and can be designed to produce an image of the highest quality. There is an important relationship between: (1) the air space between graticule 13 and lens 14, (2) the air space between lenses 14 and 16, and (3) the position and size of aperture in diaphragm 15. The invention affords a fixed relationship. Furthermore the air space between lenses 16 and 17 is fixed.

The change in magnification is secured by changing the air space between lenses 19 and 21. The real field of view remains unchanged despite change of magnification. The use of two lenses 19 and 21 allows better correction of chromatic and spherical aberrations to be attained.

It is technically possible to apply the inventive principle using more than the two ocular lenses 19 and 21, but the simpler solution of the problem is preferred.

What is claimed is:

1. A variable magnification erecting eyepiece for telescopes which comprises in combination a fixed erecting lens system having a fixed posterior focal plane; at least two optically alined ocular lenses; means supporting said ocular lenses for movement along their optical axes relatively to each other and relatively to said posterior focal plane; and means for imparting coordinated simultaneous movements to said supporting means to vary magnification while maintaining focus on said focal plane throughout movement of said ocular lenses along their axes.

2. The combination defined in claim 1 in which the erecting lens system is constructed as a self-contained subassembly including a tubular housing in which the erecting lenses and at least one diaphragm are fixedly mounted.

3. The combination defined in claim 1 in which the erecting lens system is constructed as a self-contained subassembly including a tubular housing in which the erecting lenses and two diaphragms are fixedly mounted, one of said diaphragms being between lenses and the other being at the posterior focal plane of the system.

4. An erecting telescope comprising a tube having an objective lens system and an erecting lens system alined therewith and each fixedly mounted within the tube and having a fixed posterior focal plane; and an ocular lens system associated therewith and comprising at least two axially alined lenses, adjustable mounts supporting said lenses, one for guiding each of said lenses for movement relative to each other in axial directions whereby the air space between said lenses may be varied to vary the magnification and means for imparting coordinated simultaneous movements to said mounts to vary magnification while maintaining focus on said focal plane.

GÜNTHER F. E. LOECK.

References Cited in the file of this patent

UNITED STATES PATENTS

| Number | Name | Date |
|---|---|---|
| 169,917 | Nystrom | Nov 16, 1875 |
| 936,541 | Kellner | Oct. 12, 1909 |
| 1,091,933 | Humbrecht | Mar. 31, 1914 |
| 1,126,397 | Cleary | Jan. 26, 1915 |
| 1,952,759 | Konig | Mar. 27, 1934 |
| 2,006,464 | Laube et al. | July 2, 1935 |
| 2,171,360 | Strang | Aug. 29, 1939 |
| 2,430,549 | Altman | Nov. 11, 1947 |
| 2,454,686 | Back | Nov. 23, 1948 |
| 2,479,792 | Tackaberry | Aug. 23, 1949 |
| 2,489,578 | Hillman | Nov. 29, 1949 |